(12) United States Patent
Mehta et al.

(10) Patent No.: US 8,051,034 B2
(45) Date of Patent: Nov. 1, 2011

(54) PARALLEL PROCESSING OF ASSIGNED TABLE PARTITIONS

(75) Inventors: Harish Mehta, Walldorf (DE); Heiko Gerwens, Heidelberg (DE)

(73) Assignee: SAP AG, Walldorf (DE)

( * ) Notice: Subject to any disclaimer, the term of this patent is extended or adjusted under 35 U.S.C. 154(b) by 930 days.

(21) Appl. No.: 11/818,731

(22) Filed: Jun. 15, 2007

(65) Prior Publication Data

US 2008/0313189 A1 Dec. 18, 2008

(51) Int. Cl.
*G06F 7/00* (2006.01)
*G06Q 40/00* (2006.01)

(52) U.S. Cl. ........... 707/607; 707/770; 707/973; 705/35

(58) Field of Classification Search .................. 707/770, 707/950, 971–973, 607; 705/35
See application file for complete search history.

(56) References Cited

U.S. PATENT DOCUMENTS

| 5,765,146 | A * | 6/1998 | Wolf et al. | 1/1 |
|---|---|---|---|---|
| 6,415,297 | B1 * | 7/2002 | Leymann et al. | 707/608 |
| 6,523,036 | B1 * | 2/2003 | Hickman et al. | 707/704 |
| 7,389,256 | B1 * | 6/2008 | Adams et al. | 705/35 |
| 2003/0028509 | A1 * | 2/2003 | Sah et al. | 707/1 |
| 2004/0133714 | A1 * | 7/2004 | Haren | 710/52 |
| 2006/0230098 | A1 * | 10/2006 | Shen et al. | 709/201 |

\* cited by examiner

*Primary Examiner* — John Cottingham
*Assistant Examiner* — James E Richardson
(74) *Attorney, Agent, or Firm* — Mintz, Levin, Cohn, Ferris, Glovsky and Popeo, P.C.

(57) ABSTRACT

Methods and apparatus, including computer program products, for parallel processing of assigned table partitions. In general, a group of data may be received and at least a portion of the data may be caused to be assigned to an application server to process the data based at least in part on the application server and the at least a portion of the data being assigned to a same segment. A segment may represent one or more partitions of data of a database, such as a multidimensional database or a flat database. The data that is processed may be payment items that are processed as part of payment order processing by a payment engine.

20 Claims, 3 Drawing Sheets

PARALLEL PROCESSING OF ASSIGNED TABLE PARTITIONS

BACKGROUND

The present disclosure relates to data processing by digital computer, and more particularly to parallel processing of assigned table partitions.

In general, a database table, which may be simply referred to as a table, may contain a variety of information that is managed by a database management system. Applications may be retrieve information from the database by sending requests to the database management system.

To prevent data corruption, locks may be used such that data might not be accessed by one application if it is already being worked on by another. The use of locks may generate a performance penalty when multiple applications access data in a same table as applications must wait for data to be free of a lock before a database management system provides access to the data.

SUMMARY

The subject matter disclosed herein provides methods and apparatus, including computer program products, that implement techniques related to parallel processing of assigned table partitions.

In one general aspect, each of multiple application servers is assigned to one of multiple segments of a database table, a group of data to be processed is received, at least a portion of the data is assigned to one of the segments, and the assigned data is caused to be processed by an application server from the multiple application servers based at least in part on the application server and the assigned data being assigned a same segment. In that aspect, each application server is assigned a single segment and one or more application servers are assigned a same segment.

In a related aspect, a group of data to be processed may be received and at least a portion of the data may be caused to be distributed to an application server based at least in part on the application server and the at least a portion of the data being assigned to a same segment. In that aspect, each of multiple application servers is assigned to one of multiple segments of a database table.

In a related aspect, a group of data to be processed may be received and at least a portion of the data may be caused to be assigned to an application server to process the data based at least in part on the application server and the at least a portion of the data being assigned to a same segment.

The subject matter may be implemented as, for example, computer program products (e.g., as source code or compiled code tangibly embodied in computer-readable media), computer-implemented methods, and systems.

Variations may include one or more of the following features.

The data may relate to payment order processing. The data may include a payment order having multiple payment items.

The application server may be assigned one or more payment orders if the number of payment items in the one or more payment orders is below a threshold number. The application server may be assigned a packet representing a portion of a payment order if a number of payment items in the payment order are above the threshold number.

Each of the segments may represent one or more partitions of a database.

The partitions may be based on a segment key, other fields of a payment item, or both. The segment key may be used to identify a segment assigned to one or more partitions.

Each of the partitions may have one or more indexes, where the one or more indexes have same combinations of fields for each of the partitions. Similarly, groups of partitions may have one or more indexes having a same combination of fields.

An index might not be built or populated if an index is to contain only null values.

Other portions of the data may be assigned to other segments in accordance with a distribution scheme.

The subject matter described herein can be implemented to realize one or more of the following advantages. In contrast to a situation where a payment engine may process payment orders received by a bank and multiple application servers may process the payment orders, and, locking of the payment order data may be a performance bottleneck, a partitioning of payment order data may assist in reducing locking of the data or other resources. For example, a system not including partitioning and assignment of data to respective application servers may have an throughput of tens of thousands of payment orders having a thousand payment items per an hour or hundreds of thousands of single payment item payment orders which may be acceptable in some system landscapes, while, in a system landscape expected to handle millions of transactions per an hour might not be achievable without large hardware expenditures; whereas, partitioning and assignment of data to respective application servers may allow the system landscape to handle millions of transactions per an hour. Indexes may be aligned with partitions of data, and, indexes may only be built or populated if they are to only contain null values such that space consumed by indexes may be conserved. A partitioning of data in segments and assigning application servers to segments may assist with scalability of processing payment orders. For example, application servers may be added or removed without affecting processing of payment orders. As another example, a segment may be removed from processing without affecting an organization of data in other segments. For example, a segment may be backed-up while payment orders are processed for other segments.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
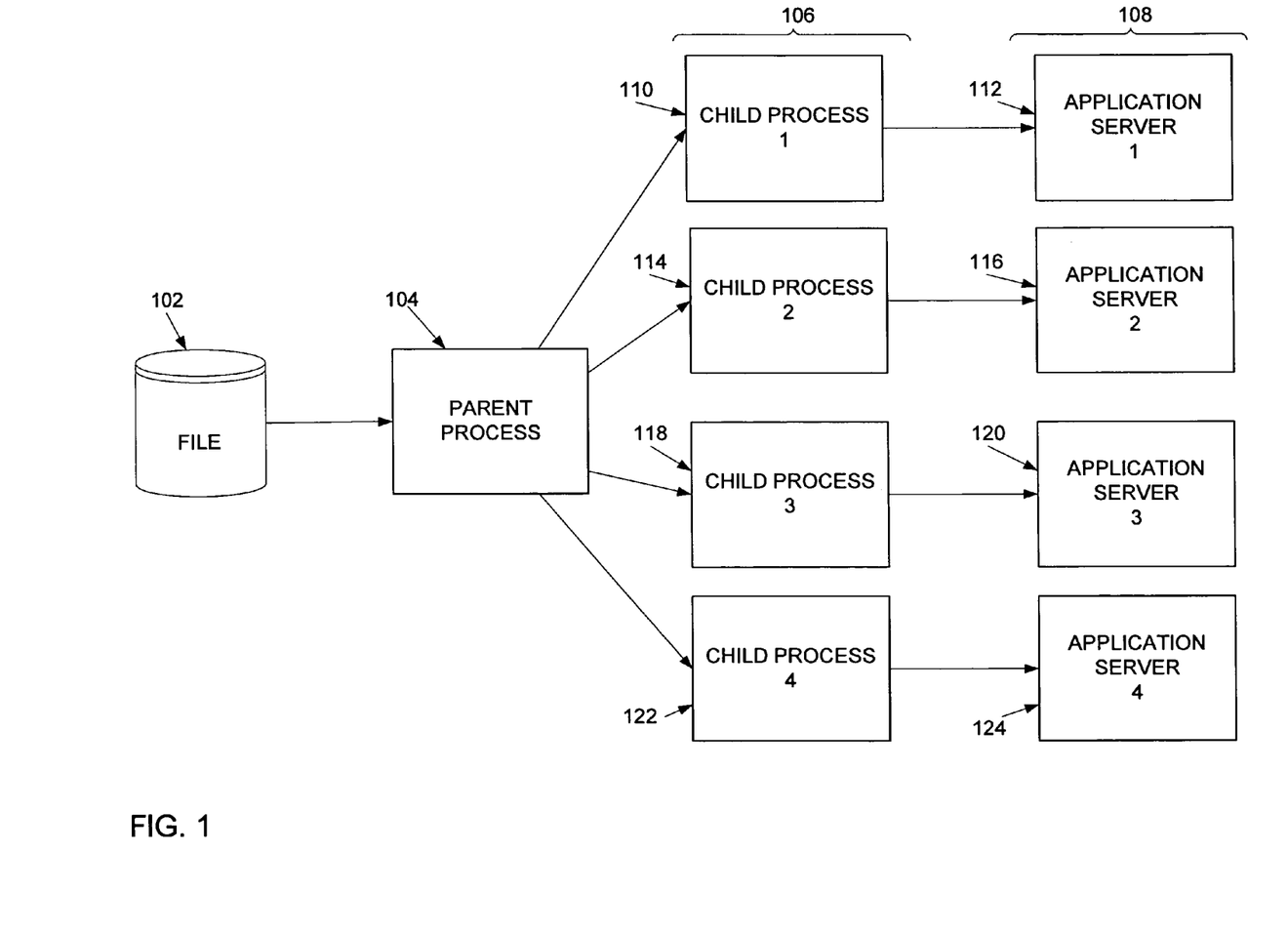
FIG. 1 is a block diagram illustrating assignment of data to be worked on in parallel.
Figure 2:
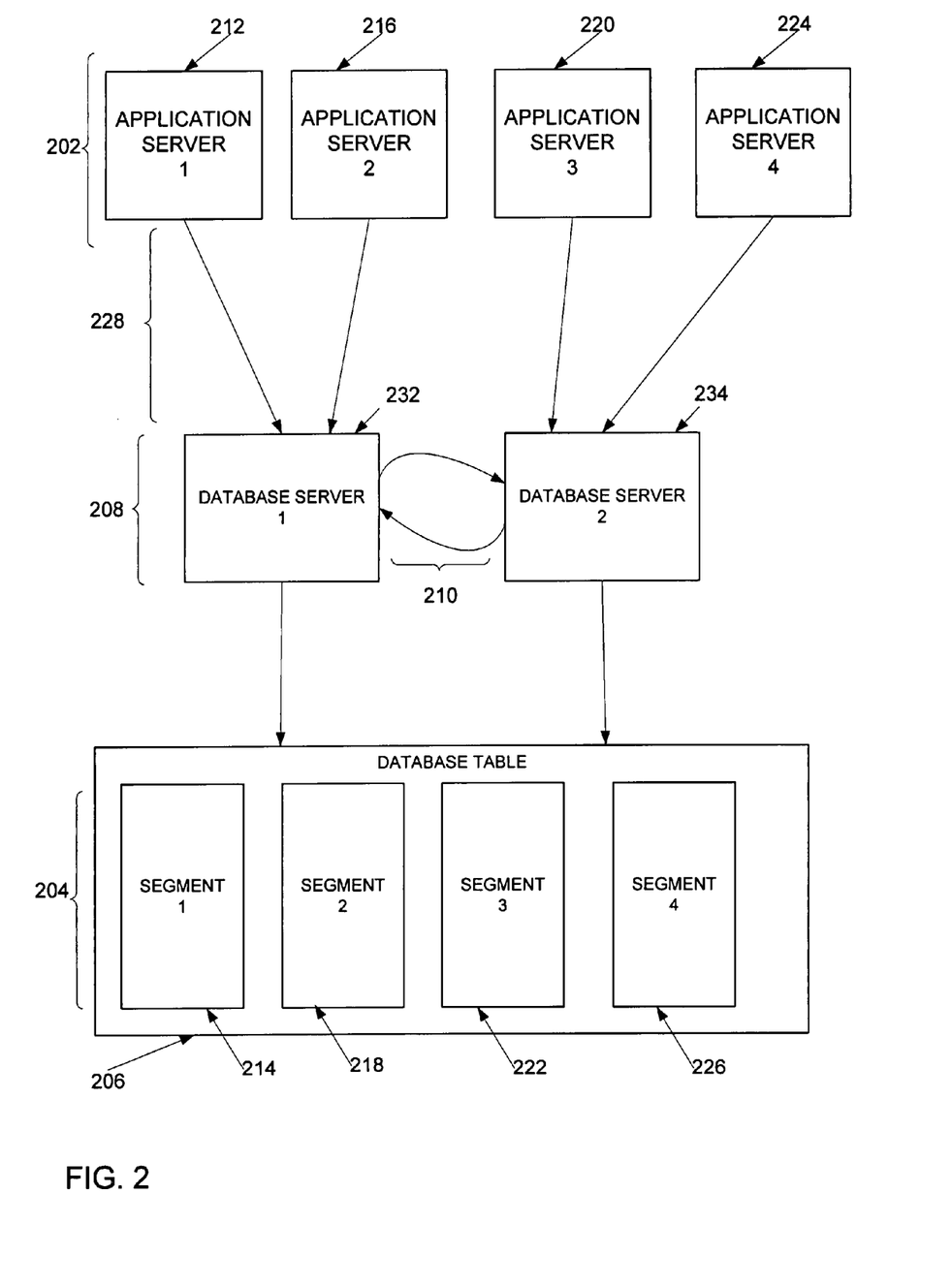
FIG. 2 is a block diagram illustrating multiple application servers for multiple segments of data.
Figure 3:
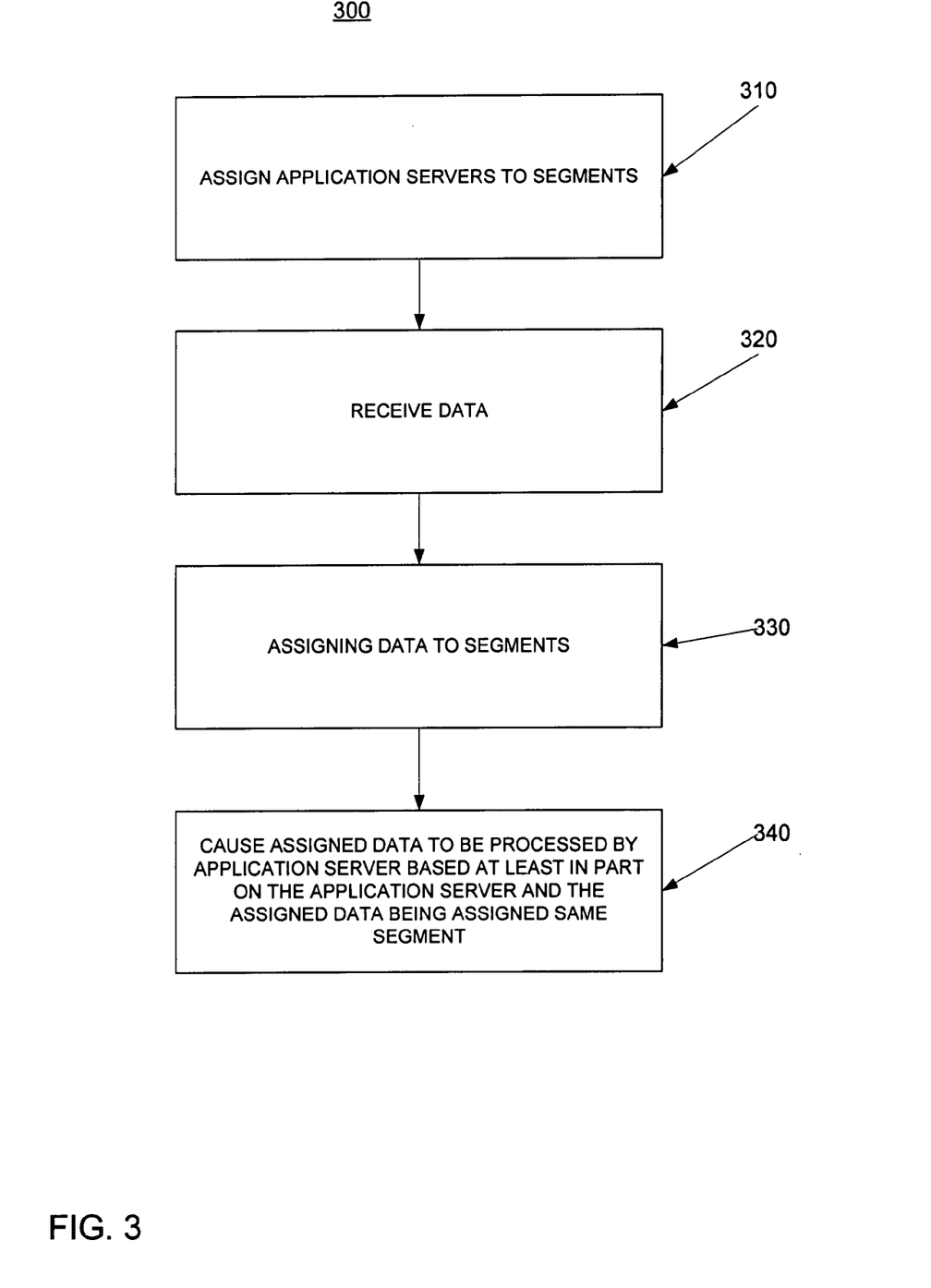
FIG. 3 is a flowchart of a process to parallel process assigned table partitions.

In general, in FIGS. 1-3, data is assigned to one of multiple segments, one or more application servers are assigned to work on a segment, and the application servers work on data assigned to that segment. Throughout the descriptions the term server is used to generally refer to a server program although the term server may also refer to a hardware server being a computer on which a server program runs. In general, a server program provides services to a client. An application server is a type of server program that provides applications to a client. SUN MICROSYSTEM's JAVA 2 ENTERPRISE EDITION is an example of an application server.

In general, the descriptions of FIGS. 1-3 include examples with reference to a payment engine and payment order processing; however, the techniques and mechanisms of FIGS. 1-3 need not be so limited in application.

FIG. 1 is a block diagram illustrating assignment of data to be worked on in parallel. In general, block diagram includes a file 102 of payment orders, and a parent process 104 to cause child processes 106 to work on application servers 108, which may execute payment orders.

The file 102 may contain a plurality of payment orders to be distributed by the parent process 104 to the child processes 106. For example, the file 102 may be received by a bank as a list of payment orders to be processed by the bank as a receiving bank. In general, a payment order is an order to a bank (or other financial institution) to execute, for example, a bank transfer or a debit memo collection. A payment order may include two or more payment items that correspond to one ordering party or beneficiary item, and one or more recipient items. A payment order having one recipient item may be referred to as a payment order and a payment order with several recipient items may be referred to as a collective payment order. A payment item may be a one-sided turnover on an account, representing either a credit or a debit, and a payment item may include one or more payment item positions with a same item identification, such as a return of a debit memo with corresponding return charge. Settlement of a payment order may be referred to as execution of a payment order.

The parent process 104, child processes 106, and application servers 108 may be components of what may be referred to as a payment engine, which may be a central processing and monitoring system for inter bank and intra bank money transfers, which may further include the components of FIG. 2. The payment engine may be required to process high volumes of data on a daily basis (e.g., 10 million transactions per hour initiated by 80,000-100,000 systems). The payment engine may be a central system with respect to an enterprise landscape comprising many other types of systems.

The parent process 104 may be responsible for distributing payment orders to the child processes 106 for work at the application servers 108. In particular, smaller payment orders may be distributed to a single child process, which may mange execution of payment orders at one of the application servers 108, while larger payment orders are broken into packets, where the packets are managed by any number of the child processes 106 for processing at the application servers 108. In addition to smaller payment orders being distributed to a single child process, multiple smaller payment orders may be aggregated together for processing as a single job by a single child process.

The parent process 104 may run on any of the application servers 108 or on another application server, separate from the application servers 108. Each of the child processes 106 may run on respective application servers 108. For example, a first child process 110 may run on a first application server 112; a second child process 114 may run on a second application server 116; a third child process 118 may run on a third application server 120; and a fourth child process 122 may run on a fourth application server 124. Although only one child process is shown per an application server, in some implementations, any number of child processes may run on one of the application servers 108.

To distribute small and larger payment orders, the parent process 104 may first cause larger payment orders to be broken into packets for processing by the child processes 106 before selecting small payment orders to be processed by the child processes 106. For example, large payment orders may first be broken into packets and then distributed to the child processes 106 by the parent process 104 before the parent process 104 causes the child processes 106 to process smaller payment orders at one of the application servers 108.

To determine whether a payment order is small or large enough for parallel processing by the child processes 106 and application servers 108, a number of recipient items of a payment order may be used as a metric against which a threshold value is compared. For example, if a number of recipient items are equal to, or more than, a threshold value of a parameter then a payment order may be considered a large payment order and that may be checked and processed in packets.

To distribute packets of a large payment order across the child processes 106, a combination of properties of a payment order may be used to break up packets and a round robin scheme may be followed to determine distribution. For example, a payment order may have a number of recipient items and a packet size may determine how many packets should be made, and, a payment item range may be set as a property for a packet. For example, a payment order may have 600 payment items, a packet size may have a fixed size of 100, there may be four application servers, and boundaries for item ranges may be calculated as 0-99, 100-199, and so on such that there are six packets, and each of those ranges may be assigned to one of four child processes 106 for the four application servers. Payment orders may be broken up and stored before being caused to be processed by the application servers.

As an example of how a round robin scheme may be implemented, items being in a first, same item range for each of the application servers may first be caused to be executed by the application servers, then, items being in a second, same item range for each of the application servers may be caused to be executed by the application servers, and so on. For example, items in the range 0-99 may be caused to be executed on each of the application servers, then, items in the range 100-199 may be caused to be executed on each of the application servers, and so on. The round robin scheme may assist in providing a balanced load across the application servers.

The child processes 106 of application servers 108 are responsible for payment items to be processed. The child processes 106 are controlled by the parent process 104. For example, a remote function call from the parent process 104 to one of the child processes 106 of application servers 108 may indicate a payment order, a range of items to be processed, and a segment for the range of items. For example, an asynchronous remote function call may be initiated by the parent process 104, one of the child processes 106 may receive the call, and cause an indicated range of payment items to be processed by one of the application server 108 being assigned to a segment indicated in the remote function call.

The parent process 104 may be barely used to control the child processes 106. Contexts of each of the child processes 106 may be reused to improve performance. For example, the contexts of a child process may be reused for different data packets. Advantageously, by reusing a same child process for different data packets, a program context need not be generated again and already generated class instances may be reused multiple times (e.g. a standard header instance may be reused). Were the contexts not to be reused, generation of a program context and class instances may cause an additional load on an application server.

The system of FIG. 1 may be used to post payment items of payment orders. In addition, other tasks may be performed that use a similar distribution of work to be performed on payment items as part of a bank transfer. Other tasks may include checking, collecting, and summing of payment items, some of which may need to be performed for large payment orders, such as large payment orders consisting millions of payment items. Similarly, these tasks may be performed in the system of FIG. 2.

FIG. 2 is a block diagram illustrating multiple application servers 202 for multiple segments 204 of data. In general, the data in the segments 204 are data related to payment items used in payment order processing. For example, a row of one of the segments 204 may represent an individual payment item.

In general, operation of the components of FIG. 2 includes processing payment items of a segment by a same one or more application servers assigned to the segment. This may optimize parallel processing of the data in the segments 204 by reducing locks associated with processing of a single table by multiple application servers. In addition, data may be allocated to individual application servers in ranges of payment items of a payment order (as described with reference to FIG. 1, for larger payment orders) which may reduce processor and memory consumption as data locality may be provided. Also, enforcing data affinity such that a same one or more application servers works on a single segment may ensure that load balancing based on a distribution of payment orders or packets of payment items of payment orders (e.g., as discussed above with reference to round robin distribution of packets of payment items) is more likely to have beneficial effects.

The segments 204 of data represent portions of a database table 206 that are separated into different segments at a technical level. For example, each of the segments 204 may be separate partitions or groups of partitions of a table, where each partition may be referred to as a sub-table being a subset of data of a logical table arranged in multiple technical, underlying tables. For example, if the table 206 is a flat table, each of the segments may have their own sets of rows and data from any of the segments may be independent of data in other segments such that, for example, access to a row in one of the segments has no affect to other rows in other segments. For example, modifying a row in one segment need not cause resources of another table to be locked to ensure synchronized data and only rows in the segment being worked on need be locked.

The segments 204 may be segments of multi-dimensional data or flat data. For example, the segments 204 may represent one or more partitions of a multi-dimensional database. Each partition or a group of partitions may act as an independent database that may be processed via parallel processing by application servers responsible for that partition or group of partitions.

To assist with identifying partitions or groups of partitions that make up segments, a segment key being a value identifying a segment may be a property used to identify each segment. A segment key may be a field (e.g., an attribute) of a record used by the database servers 208, the application servers 202, other components (e.g., such as a parent process 102 of FIG. 1), or any combination of components to identify a location of a particular record. To save space, a segment key may be an inherent property of a technical partition of the table 206 and need be a value of a field in the table 206. For example, physical indexes being partitions of the table 206 may be identified by a segment key corresponding to the records in the physical indexes. For example, a segment key A may be used to identify a physical partition A being a table having all records assigned to a segment A of the table 206, yet, a column or field of the partition A need not include an attribute to identify a segment as all records in the partition are necessarily identified by their partition identifier.

Segments may include several physical partitions, and a combination of a segment key and any number of other keys may be used to identify a particular partition. For example, an attribute named "client" of payment item records may have four possible values and may further be used to partition a table having four segments such that there is a combination of sixteen partitions. For example, the attribute client may have as possible values ABC, DEF, GHI, JKL and segments may be labeled A through D such that a partition may be identified by a combination of a client and segment of a partition, such as client DEF and segment A. Groups of partitions having a same segment key may represent a segment (e.g., partitions ABC, B; DEF, B; GHI, B; and JKL, B may belong to a segment B).

The segments 204 may be assigned to records of data based on rules associated with processing of the data. For example, the segments 204 may be assigned based on a round robin process for packets of payment items of a payment order and payment orders. For example, similar to the description of round robin execution of payment orders with reference to FIG. 1, large payment orders may be processed first with a first packet of payment items assigned to a first application, a second packet of payment items assigned to a second application server, and so on, then, a first group of one or more small payment orders may be assigned to a first segment, a second group of one or more small payment orders may be assigned to a second segment, and so on.

As discussed above, one or more of the application servers 202 may be assigned to one or more of the segments 204 and the system of FIG. 2 may enforce data affinity to ensure that processing of a segment is performed by the one or more application servers assigned to the segment. For example, the first application server 212 may be assigned to the first segment 214, the second application server 216 may be assigned to the second segment 218, the third application server 220 may be assigned to the third segment 222, and the fourth application server 224 may be assigned to the fourth segment 226. Each of the application servers 202 may run on a respective hardware server to distribute use of processing resources, such as cache memory. In general, parallel processing may be performed in the system of FIG. 2 by having one application server process a respective one or more payment items while one or more other application servers process respective one or more payment items.

The database servers 208 are database management systems of the database table 206. Each of the database servers 208 may ensure data affinity between the application servers 202 and the segments 204. The database servers 208 may further generate indexes for each partition of the table 206 and may maintain delta indexes. To ensure synchronous data the database servers 208 may communicate as indicated by the arrows 210.

To eliminate or reduce communication among the database servers 208 (e.g., to reduce synchronization of data managed by each of the database servers 208), each of the database servers 208 may be assigned application servers for like segments. For example, in FIG. 2, the arrows 228 may indicate that the first and second application servers 212, 216 interface with a first database server 232, and the third and fourth application servers 220, 224 interface with a second database server 234, where the first application server 212 is assigned to the first segment 214, the second application server 216 is assigned to the second segment 218, the third application server 220 is assigned to the third segment 222, and the fourth application server 224 is assigned to the fourth segment 226. In that example, the first database server 232 may only interface with the first and second segments of data 214, 218, and the second database server 230 may only interface with the third and fourth segments of data 222, 226, respectively, due to the segmentation and data affinity such that updates need not occur across the database servers 208 to synchronize data. As another example, in some implementations multiple application servers assigned to a same segment may be assigned to a same database server to reduce or eliminate synchronization across multiple database servers.

To align indexes for the table 206 such that any of the segments 204 may be removed without affecting indexing, indexes may be generated for each of the segments 204 or each of the partitions of the segments 204. For example, if there are three partitions for each of the four segments 204, and there are five indexes representing a combination of attributes, key figures, or both of records, there may be five indexes for each of the four segments such that there is a total of twenty indexes, or there may be five indexes for each partition such that there is a total of 60 indexes. If a partition or segment is dropped (e.g., if a segment is exported or a segment becomes corrupt), indexes for other partitions or segments, respectively, need not be rebuilt and may continue to be used independent of that partition or segment.

To reduce storage space occupied by indexes, indexes may only be built or populated if they would have entries other than null. For example, when records are imported into the table 206, some fields may be filled with null (e.g., some records may have no value for a particular attribute or key figure; e.g., some fields may only be filled with a non-null value during later stages of payment processing but not during importing of payment items). Those fields may be used in one or more indexes for segments or partitions of the table 206. For example, a combination of five fields may be used in an index and all of their values may typically be null as a result of importing payment item records. Thus, that index might not be generated or entries for that index might not be generated to as part of a tacit understanding that only null entries exist (e.g., if the index is queried, null may be returned as a response). A reduction of storage space may be further improved as a result of the indexes being aligned with segments or partitions such that an index for a combination of fields may be generated for one segment or partition but not for another segment or partition.

In addition, a reduction of storage space may be further improved as an index may be generated for each partition or segment, and the indexes may be identified by a combination of fields used to partition records and an amount of fields represented by an index may be reduced such that indexes may be more likely to have only null values and indexes are less likely to be generated or filled. For example, an index may represent a combination of five fields being client name, clearing area, reference number for outgoing payment order, payment item kind, and payment item number. Records may be partitioned using the client name and clearing area and partitions may be identified using these fields, such that, for example, for three types of client names and three types of clearing areas there are a combination of nine different possibilities. Indexes may be generated for each partition and may be identified by the combination of the fields used for partitioning. Thus, the indexes need not include values for the client name and clearing area such that when records are imported only non-null entries for the three fields reference number for outgoing payment order, payment item kind, and payment item number are considered when determining whether to build or populate an index.

A payment system including the components of FIG. 2 may be able to easily scale when larger amounts of data are processed, or when additional hardware is added. For example, an addition of a database server, segments, an application server, or a combination of components may be performed without having to make significant changes to other components. For example, an application server may be added and assigned to a segment without having to redefine one of the segments 204.

Although FIG. 2 includes one logical table 206 that is used for payment order processing that is broken into the four segments 204, any number of logical tables may be broken into any number of segments. A size of segments may be optimized based on properties of one or more application servers assigned to a segment. For example, a size of a segment may be chosen such that indexes of a segment may fit into main memory, such as volatile memory, of an application server such that indexes of the server may be quickly accessed.

FIG. 3 is a flowchart of a process 300 to parallel process assigned table partitions. The process 300 may be performed by one or more components of a payment engine. For example, the parent process 104 of FIG. 1 may perform the process 300. Although discussed with reference to processing payment items of payment orders, other types of data may be processed in accordance with the process 300.

In general, the process 300 involves assigning application servers to segments (310), receiving data (320), assigning data to segments (330), and causing assigned data to be processed by application server based at least in part on the application server and the assigned data being assigned a same segment (340).

Application servers are assigned to segments (310). The assignment of application servers to segments may be dictated by a user (e.g., an administrative user of a payment engine) or automatically by a program (e.g., based on a number of segments and a number of application servers). An assignment of application servers to segments may be stored in a configuration file.

A system may include any number of segments, and a number of segments may be based on a number of available application servers. For example, if there are four application servers, four segments may be chosen to be generated.

In general, a segment is a portion of a database table that may be independently processed from other segments. For example, a segment may include a number of records of a logical table. A system may include multiple tables, each with their own number of segments. Assignment of segments may differ for different tables. In general, a segment does not represent content of a record and is not visible to an end-user. For example, a record of a payment item might not normally include a segment key and a segment key may be added to a record to show an assignment of a payment item to a particular segment. A segment may be generated by partitioning a database and identifying one or more partitions of a database as a particular segment in a group of segments.

In general, an application server is a server that offers services to a client. In a payment processing environment, an application server may process payment orders or assist in processing of payment orders in response to a request to process a payment order where the request is from a client. For example, one of the child processes 106 of FIG. 1 may send an asynchronous remote function calls to an application server to request processing of one or more payment items of one or more payment orders.

In general, one or more application servers may be assigned a single segment, such that there is a one to N relationship between segments and application servers and a single application server is not assigned multiple segments.

Data is received (320). The data that is received may be payment orders. For example, the data may be the file 102 of FIG. 1. The data may be received at a payment engine. For example, the data may be received by a payment engine of a banking institution and the data may be sent from one or more other institutions requesting the payment orders to be processed. For example, a first bank may send a list of transfers to or from a second bank having a payment engine to process payment orders representing the transfers.

Data is assigned to segments (330). For example, payment orders, or portions of payment orders, in the file 102 of FIG. 1 may be assigned to segments. The segments used for assigning the data and the segments used for assigning the application servers are the same pool of segments. Thus, for example, a same segment assigned to data and an application server may characterize a relationship between the two. In general, one portion of data is only assigned to one segment. For example, in a system including a payment item database, one payment item is only assigned to one segment such that the payment item is only represented in one segment of a database and is only processed by one group of application servers assigned to the segment. Payment orders may be assigned to segments based on a number of payment items in a payment order. For example, small payment orders may be aggregated together for processing by a single application server. As another example, a large payment order may be split into several packages, with each having a range of payment items. In that example, the packages may be assigned to a segment in accordance with a round-robin scheme.

Assigned data is caused to be processed by an application server based at least in part on the application server and the assigned data being assigned a same segment (340). For example, in response to a remote function call requesting processing of a package of payment items, the package may be processed by an application server assigned to the same segment to which the package is assigned. Data may be caused to be processed by application servers in parallel such that, for example, a first application server assigned to a first segment works on payment items of the first segment while a second application server assigned to a second segment works on payment items of the second segment, and so on. Distributing the load of processing may be performed in accordance with a round-robin scheme.

Although FIG. 3 includes a certain combination and type of sub-processes, the process 300 may involve fewer, different, or additional sub-processes.

Although each of the figures describes a certain combination of features, implementations may vary. For example, additional, different, or fewer components may be included in the system 200 of FIG. 2.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, embodied in a non-transitory computer-readable storage medium, the computer program product being operable to cause data processing apparatus to perform operations comprising:
    assigning, using a plurality of synchronized database servers, each application server of a plurality of application servers to a corresponding segment of a plurality of segments of a database table, each application server being assigned a single segment and one or more application servers assigned a same segment, each database server of the plurality of synchronized database servers being assigned corresponding one or more application servers, each segment having at least one separate and corresponding index;
    receiving, at each application server, corresponding data to be processed;
    assigning, based on a number of items within a portion of the data and based on the assignment of each application server to the corresponding segment and based on a round robin scheme, the portion of the data to the corresponding segment; and
    causing the assigned data to be processed by an application server of the plurality of application servers based at least in part on the application server and the assigned data being assigned a same segment.

2. The product of claim 1, wherein the data relates to payment order processing, and wherein the round robin scheme comprises execution of each item of the items on each application server of the plurality of application servers to determine a balanced load configuration of the plurality of application servers such that the assignment of the portion of the data to the corresponding segment provides load balancing.

3. The product of claim 1, wherein the data comprises a plurality of payment orders, and wherein the portion of the data comprises a payment order of the plurality of payment orders, the items within a portion of the data being a plurality of payment items.

4. The product of claim 3, wherein the application server is assigned one or more payment orders if the number of payment items in the one or more payment orders is below a threshold number and the application server is assigned a packet representing a portion of a payment order if a number of payment items in the payment order are equal or above the threshold number.

5. The product of claim 1, wherein each of the segments represents one or more partitions of a database.

6. The product of claim 5, wherein the partitions are based on fields of a payment item and a segment key, the segment key to identify a segment assigned to a partition.

7. The product of claim 5, wherein each of the partitions has one or more indexes, the one or more indexes having same combinations of fields for each of the partitions.

8. The product of claim 7, wherein an index from the one or more indexes is not built or populated if the index is to contain only null values.

9. The product of claim 1, wherein the operations further comprise:
    assigning other portions of the data to other segments in accordance with a distribution scheme.

10. A computer implemented method comprising:
    assigning, using a plurality of synchronized database servers, each application server of a plurality of application servers to a corresponding segment of a plurality of segments of a database table, each application server being assigned a single segment and one or more application servers assigned a same segment, each database server of the plurality of synchronized database servers being assigned corresponding one or more application servers, each segment having at least one separate and corresponding index;
    receiving, at each application server, corresponding data to be processed;
    assigning, based on a number of items within a portion of the data and based on the assignment of each application server to the corresponding segment and based on a round robin scheme, the portion of the data to the corresponding segment; and
    causing the assigned data to be processed by an application server of the plurality of application servers based at least in part on the application server and the assigned data being assigned a same segment.

11. The method of claim 10, wherein the data relates to payment order processing, and wherein the round robin scheme comprises execution of each item of the items on each application server of the plurality of application servers to determine a balanced load configuration of the plurality of application servers such that the assignment of the portion of the data to the corresponding segment provides load balancing.

12. The method of claim 10, wherein the data comprises a plurality of payment orders, and wherein the portion of the data comprises a payment order of the plurality of payment orders, the items within a portion of the data being a plurality of payment items.

13. The method of claim 12, wherein the application server is assigned one or more payment orders if the number of payment items in the one or more payment orders is below a threshold number and the application server is assigned a packet representing a portion of a payment order if a number of payment items in the payment order are equal or above the threshold number.

14. The method of claim 10, wherein each of the segments represents one or more partitions of a database.

15. The method of claim 14, wherein the partitions are based on fields of a payment item and a segment key, the segment key to identify a segment assigned to a partition.

16. The method of claim 14, wherein each of the partitions has one or more indexes, the one or more indexes having same combinations of fields for each of the partitions.

17. The method of claim 16, wherein an index from the one or more indexes is not built or populated if the index is to contain only null values.

18. The method of claim 10, further comprising:
assigning other portions of the data to other segments in accordance with a distribution scheme.

19. A system comprising:
a plurality of application servers, each application server comprising memory and at least one data processor to execute instructions stored in the memory; and
a plurality of synchronized database servers, each database server comprising memory and at least one data processor to execute instructions stored in the memory;
wherein:
   each application server is assigned, by the data processors of the synchronized database servers executing the instructions stored in the memory of the corresponding plurality of synchronized database servers, to a corresponding segment of a plurality of segments of a database table, each application server being assigned a single segment and one or more application servers assigned a same segment, each database server of the plurality of synchronized database servers being assigned corresponding one or more application servers, each segment having at least one separate and corresponding index;
   corresponding data to be processed is received at each application server;
   the portion of the data is assigned to the corresponding segment based on a number of items within a portion of the data and based on the assignment of each application server to the corresponding segment and based on a round robin scheme; and
   the assigned data is processed by an application server of the plurality of application servers based at least in part on the application server and the assigned data being assigned a same segment.

20. The system of claim 19, wherein the data relates to payment order processing, and wherein the round robin scheme comprises execution of each item of the items on each application server of the plurality of application servers to determine a balanced load configuration of the plurality of application servers such that the assignment of the portion of the data to the corresponding segment provides load balancing.

* * * * *